United States Patent

Matsuoka

Patent Number: 6,133,825
Date of Patent: Oct. 17, 2000

[54] VEHICLE OBSTACLE AND LANE CONGESTION MONITORING DEVICE AND METHOD

[75] Inventor: Katsuji Matsuoka, Tokyo, Japan

[73] Assignee: Mitsubishi Denki Kabushiki Kaisha, Tokyo, Japan

[21] Appl. No.: 09/397,643

[22] Filed: Sep. 16, 1999

[30] Foreign Application Priority Data

Jun. 2, 1999 [JP] Japan .................................. 11-154807

[51] Int. Cl.$^7$ ...................................................... B60Q 1/00
[52] U.S. Cl. ........................................... 340/436; 340/903
[58] Field of Search .................................. 340/435, 436, 340/903, 438, 440, 441, 902

[56] References Cited

U.S. PATENT DOCUMENTS

| | | | |
|---|---|---|---|
| 4,349,823 | 9/1982 | Tagami et al. ...................... | 340/815.24 |
| 5,325,096 | 6/1994 | Pakett ........................................ | 342/70 |
| 5,341,344 | 8/1994 | O'Brien et al. .......................... | 340/904 |
| 5,467,072 | 11/1995 | Michael ................................... | 340/436 |
| 5,598,164 | 1/1997 | Reppas et al. .......................... | 340/435 |

FOREIGN PATENT DOCUMENTS 10-166971  6/1998  Japan .

*Primary Examiner*—Jeffery A. Hofsass
*Assistant Examiner*—Daniel Previl
*Attorney, Agent, or Firm*—Sughrue, Mion, Zinn, Macpeak & Seas, PLLC

[57] ABSTRACT

An alarm device for vehicle operable at a time of changing lanes which does not alert in case of congestion by inputting an obstacle by a scan laser radar 1, recognizing the obstacle by a obstacle recognizing means 9 based on thus inputted information, recognizing the congestion by a lane state recognizing means 10 based on thus recognized obstacle and a state of peripheral lane, setting an optimum area for alerting by an alarm determining means 11 based on thus recognized state of lane, and conducting an alarm by an alarm means 7 based on the obstacle within the optimum area for alerting.

23 Claims, 14 Drawing Sheets

CASE 2

13 LEFT SIDE BACK AREA SET TO BE SUBJECT TO ALARM

OBSTACLES

CASE 3

OBSTACLES

13 RIGHT SIDE BACK AREA SET TO BE SUBJECT TO ALARM

CASE 8

CASE 9

VEHICLE OBSTACLE AND LANE CONGESTION MONITORING DEVICE AND METHOD

BACKGROUND OF THE INVENTION

1. Field of the Invention

The present invention relates to an alarm device for vehicle which calls a driver's attention to a danger of contacting or colliding with an obstacle at a time of changing lanes for avoiding the danger.

2. Discussion of Background

A conventional alarm device operable at a time of changing lanes is disclosed in, for example, JP-A-10-166971. This discloses that an approach of an object positioned in a side back of a vehicle is detected; a lane change and so on are judged in case that a turn signal indicator switch is not operated; and a driver is alerted.

FIG. 20 schematically illustrates a structure of the conventional alarm device.

In FIG. 20, numerical 1 designates a scan laser radar for detecting the object; numerical reference 2 designates a velocity sensor for detecting a velocity of the vehicle; numerical reference 3 designates a controller for controlling an alarm upon inputs from the scan laser radar 1 and the velocity sensor 2; numerical reference 4 designates a primary alarm lamp controlled by the controller 3; numerical reference 5 designates a secondary alarm lamp controlled by the controller 3; and numerical reference 6 designates an alarm buzzer controlled by the controller 3.

FIG. 21 is a flow chart of processes conducted by the conventional alarm device.

An operation thereof will be described in reference of the flow chart of FIG. 21.

In an alarm controlling routine for controlling the alarm by the controller 3, an area subjected to the alarm is set in Step J1. In Step J2, it is judged whether or not a representative of an object to be detected exists within area subjected to the alarm, in other words, whether or not a succeeding vehicle enters the area. When it is recognized that the succeeding vehicle exists, it is judged whether or not a relative velocity is a predetermined value or more in Step J3, wherein when the relative velocity is the predetermined value or more, the primary alarm lamp 4 is lit in Step J4 to awaken primary attention to the driver. In case that the succeeding vehicle goes out of the area subjected to the alarm in Step J2 or that the relative velocity is smaller than the predetermined value in Step J3, it is regarded that a degree of danger to a driver's own vehicle is low, wherein Step J7 is processed to turn off the primary alarm lamp 4, the secondary alarm lamp 5, and the alarm buzzer 6, each under operation. When the primary alarm lamp 4 is lit, it is judged whether or not a displacement amount of the representative in its width directions is larger than a predetermined value, wherein when the displacement amount is larger than the predetermined value, it is judged that a lane is changed and the secondary alarm lamp 5 and the alarm buzzer 6 are actuated in Step J6. When the displacement amount is smaller than the predetermined value, the secondary alarm lamp 5 and the alarm buzzer 6 are turned off in Step J7.

According thereto, in case that an object such as a succeeding vehicle approaches from a back of a driver's own vehicle when the own vehicle changes lanes or turns right or left without manipulating a turn signal indicator switch, it is possible to certainly alert, whereby a capability of avoiding accidents is improved even in cases such that a driver is careless.

However, according to the method of judging a lane-change based on the displacement amount of the object to be detected in its width directions as the above conventional technique, the judgement is conducted only after the own vehicle starts to change lanes. Therefore, there is a time lag in the judgement and a danger of contacting with a succeeding vehicle is left. To deal therewith, it is considered to judge whether or not an alarm is actuated regardless of a manipulation of a turn signal indicator switch. However, in case that the own vehicle runs through a lane adjacent to the opposite side of the road or lanes adjacent to where the own vehicle runs are congested, objects to be detected exist within an area subjected to alarm, whereby alarms are frequently actuated depending on relative velocities, to resultantly make a driver feel uncomfortable.

SUMMARY OF THE INVENTION

It is an object of the present invention to solve the above-mentioned problems inherent in the conventional technique and to provide an alarm device for vehicle operable at time of changing lanes, which does not alert when a road is congested.

Another object of the present invention is to provide an alarm device for vehicle operable at a time of changing lanes, which does not alert when a driver's own vehicle exists in peripheral lanes.

According to a first aspect of the present invention, there is provided an alarm device for vehicle operable at a time of changing lanes comprising an obstacle detecting means for detecting obstacles existing in a lane where a driver's own vehicle runs and lanes adjacent thereto, an obstacle recognizing means for recognizing the obstacles detected by the obstacle detecting means, a lane state recognizing means for recognizing a state of lanes based on the obstacles recognized by the obstacle recognizing means, an alarm determining means for determining necessity of alerting based on the obstacles recognized by the obstacle recognizing means and the state of lanes recognized by the lane state recognizing means, and an alarm means for alerting based on the determination by the alarm determining means.

According to a second aspect of the present invention, there is provided the alarm device for vehicle, wherein the state of lanes recognized by the lane state recognizing means is congestion of the lane where the own vehicle runs and the lanes adjacent thereto.

According to a third aspect of the present invention, there is provided the alarm device for vehicle wherein, the state of lanes is congestion of the lane where the own vehicle runs and the lanes adjacent thereto recognized by the lane state recognizing means based on the number of the obstacles recognized by the obstacle recognizing means within a predetermined time period.

According to a fourth aspect of the present invention, there is provided the alarm device for vehicle, wherein the state of lanes is congestion of the lane where the own vehicle runs recognized by the lane state recognizing means based on a velocity of the own vehicle being a predetermined value or less for a predetermined time period.

According to a fifth aspect of the present invention, there is provided the alarm device for vehicle, wherein the state of lanes is recognized by the lane state recognizing means under a situation that the lane where the own vehicle runs is a left or right peripheral lane.

According to a sixth aspect of the present invention, there is provided the alarm device for vehicle, wherein the state of lanes under the situation that the lane where the own vehicle runs is in the right or left peripheral lane is recognized by the lane state recognizing means based on the number of stopping obstacles existing in a right or left lane adjoining to the lane where the own vehicle runs within a predetermined time period.

According to a seventh aspect of the present invention, there is provided the alarm device for vehicle, wherein the alarm determining means sets the area subjected to alarm based on the state of lanes recognized by the lane state recognizing means and judges necessity of alerting based on the obstacles recognized by the obstacle recognizing means within thus set area subjected to alarm.

According to an eighth aspect of the present invention, there is provided the alarm device for vehicle, wherein the area subjected to alarm set by the alarm determining means excludes lanes adjacent to the lane where the own vehicle runs being in congestion.

According to a ninth aspect of the present invention, there is provided the alarm device for vehicle, wherein the area subjected to alarm set by the alarm determining means excludes a lane left adjoining to the lane where the own vehicle runs when the lane where the own vehicle runs is in the left periphery of the road and a lane right adjoining to the lane where the own vehicle runs when the lane where the own vehicle runs is in the right periphery of the road.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 21 as follows, wherein the same numerical references are used for the same or the similar portions and description of these portions is omitted.

EMBODIMENT 1

Figure 1:
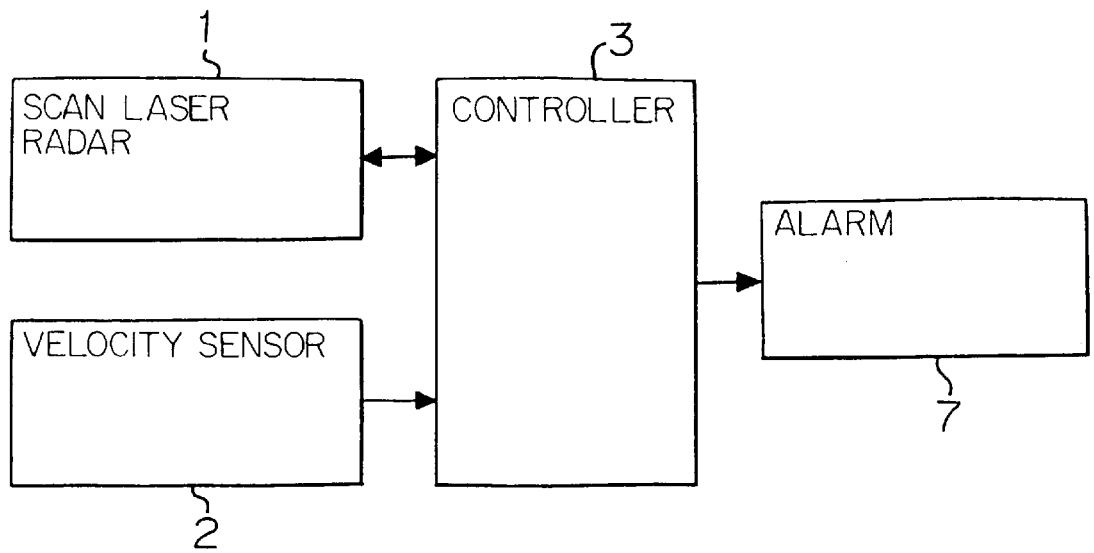
FIG. 1 schematically illustrates a structure of an alarm device for vehicle operable at a time of changing lanes according to Embodiment 1 of the present invention.

FIG. 1 schematically shows a structure of an alarm device for vehicle operable at a time of changing lanes according to Embodiment 1 of the present invention.

Figure 2:
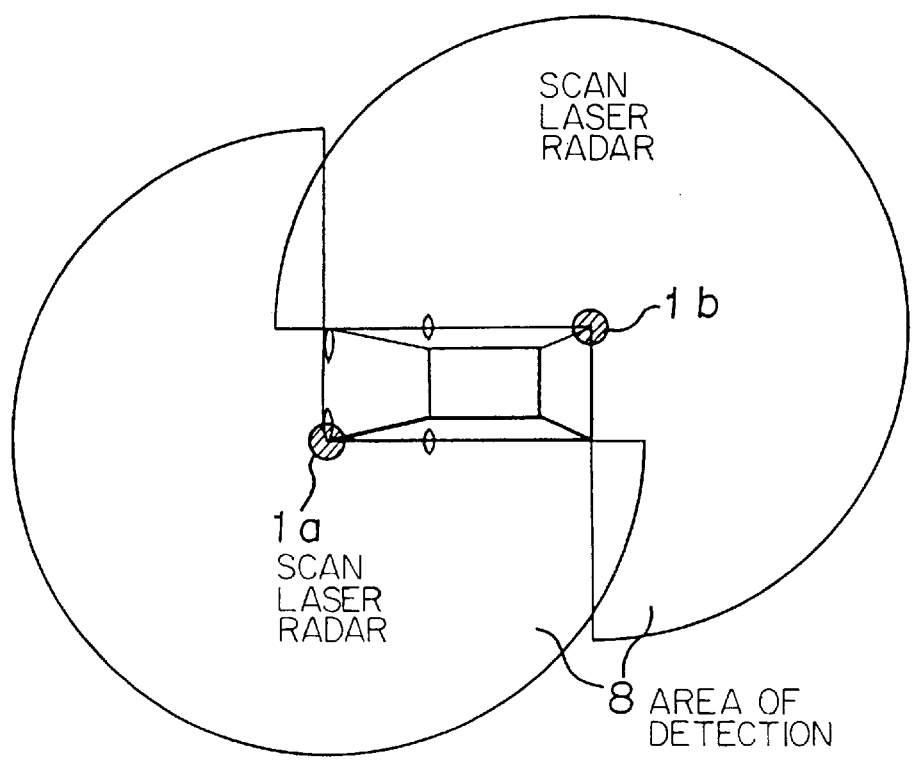
FIG. 2 illustrates an area detected by a scan laser radar illustrated in FIG. 1.

In FIG. 1, numerical reference 1 designates a scan laser radar being an obstacle detecting means for detecting obstacles and outputting information of ranges and directions; numerical reference 2 designates a velocity sensor for detecting a velocity of vehicle; numerical reference 3 designates a controller connected to the velocity sensor 2 and the scan laser radar 1; and numerical reference 7 designates an alarm means controlled by the controller 3. FIG. 2 illustrates an area detected by the scan laser radar illustrated in FIG. 1.

In FIG. 2, numerical references 1a and 1b respectively designate scan laser radars; and numerical reference 8 designates the area detected by the scan laser radars.

Figure 3:
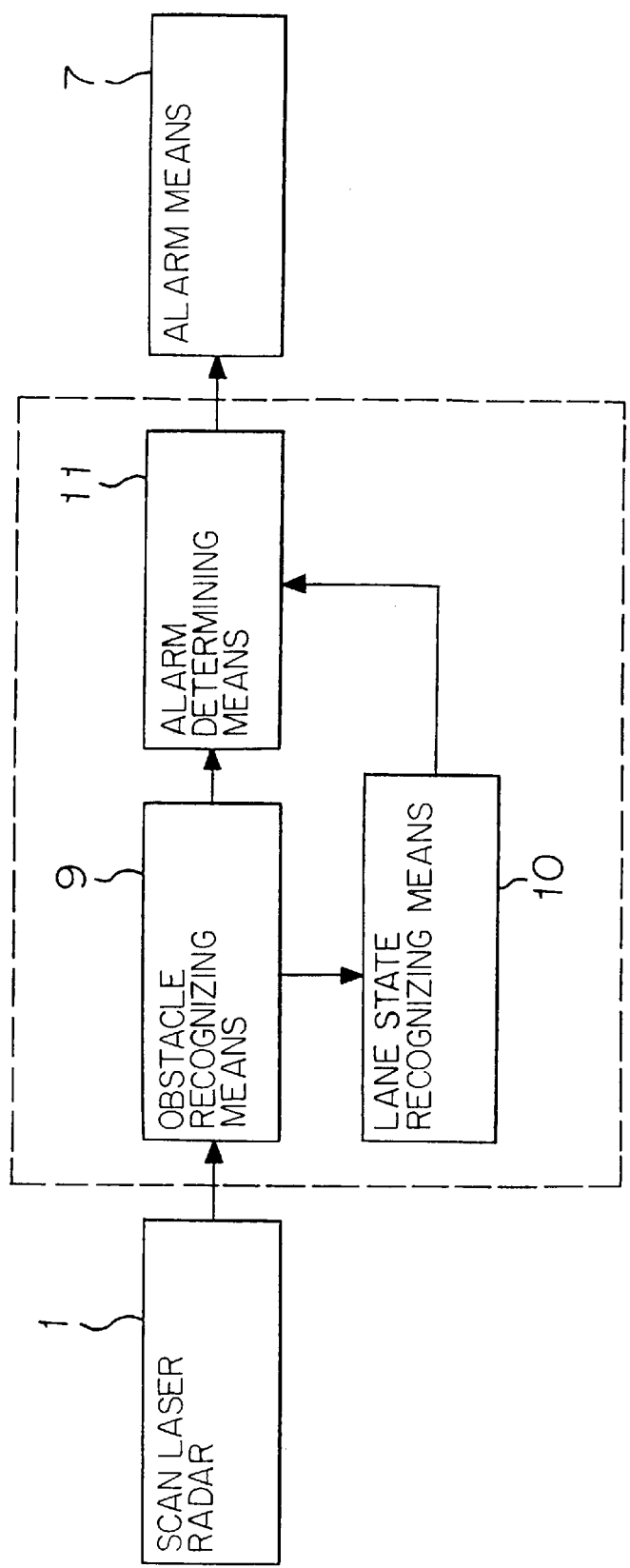
FIG. 3 is a block chart of a controller illustrated in FIG. 1.

FIG. 3 is a block chart of the controller illustrated in FIG. 1.

In FIG. 3, numerical reference 9 designates an obstacle recognizing means for detecting shapes and positions of the obstacles based on the information of range and direction outputted from the scan laser radar 1 and recognizing the obstacles by comparing the shapes of the obstacles with a predetermined shape; and numerical reference 10 designates a lane state recognizing means for inputting outputs from the obstacle recognizing means 9 for judging congestion of a lane where a driver's own vehicle runs and adjacent lanes thereto and also whether or not the own vehicle runs through lanes in the periphery of the road (hereinbelow, referred to as peripheral lanes).

Numerical reference 11 designates an alarm determining means inputting a result of recognizing the obstacles by the obstacle recognizing means 9 and a result obtained by the lane state recognizing means 10 for judging whether or not the alarm is performed, wherein the alarm is performed by the alarm means 7 when it is judged that there is a danger.

Figure 4:
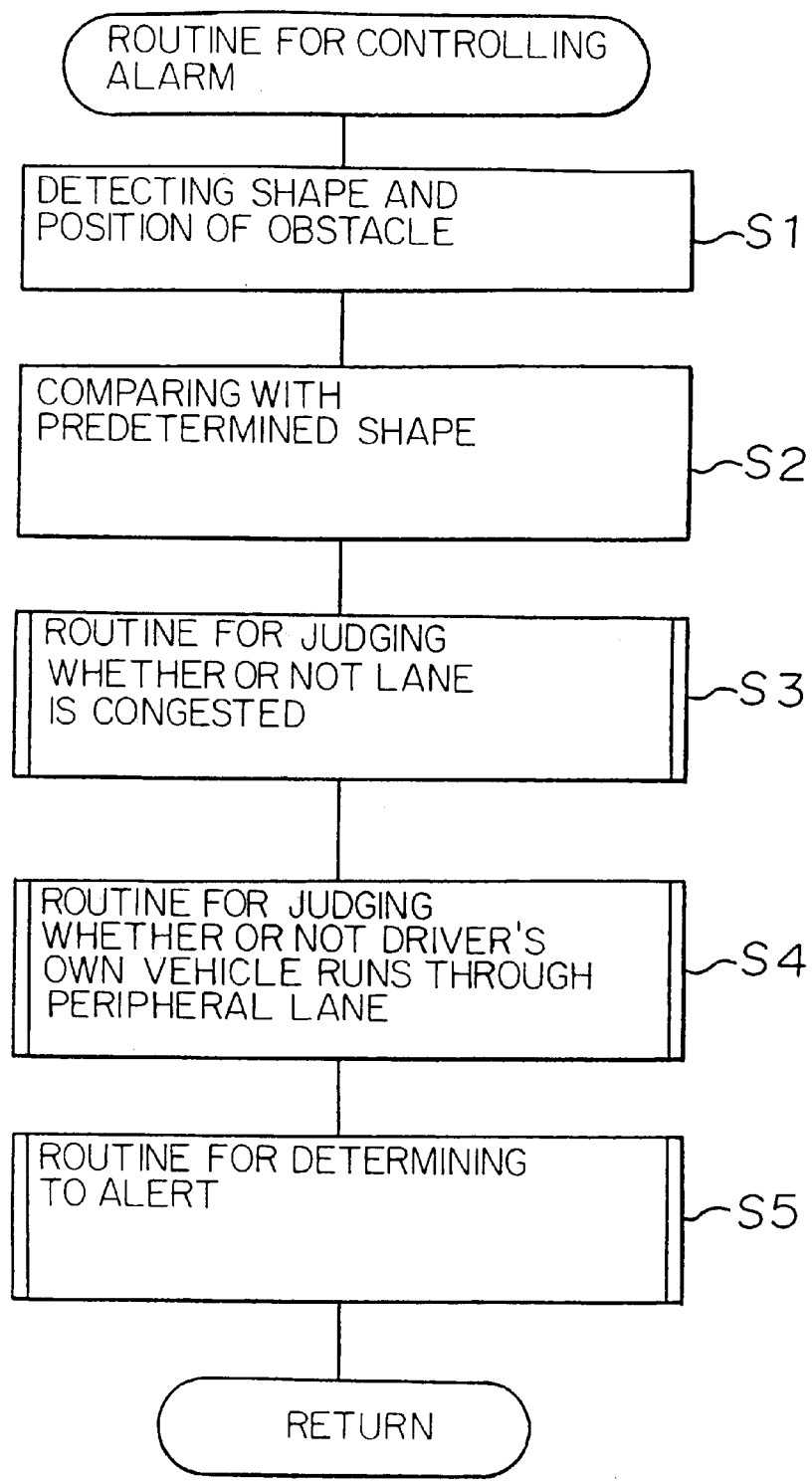
FIG. 4 is a flow chart illustrating a routine of controlling an alarm by the alarm device for vehicle operable at a time of changing lanes according to Embodiment 1 of the present invention.

FIG. 4 is a flow chart illustrating a routine for controlling alarm in the alarm device for vehicle according to Embodiment 1.

Figure 5:
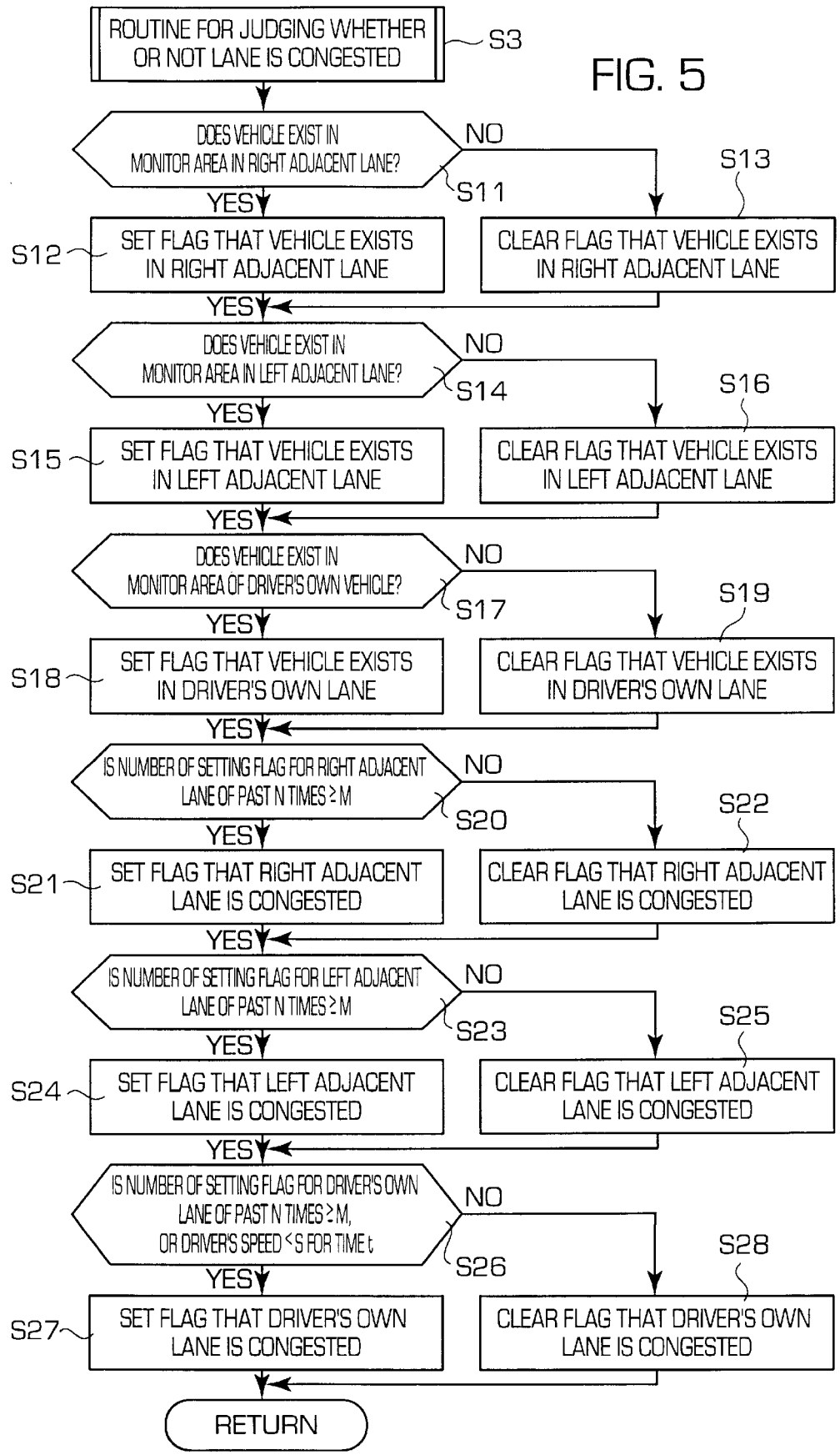
FIG. 5 is a flow chart illustrating a routine of judging congestion of lanes by the alarm device for vehicle according to Embodiment 1 of the present invention.

FIG. 5 is a flow chart illustrating a routine for judging congestion in the alarm device for vehicle according to Embodiment 1.

Figure 6:
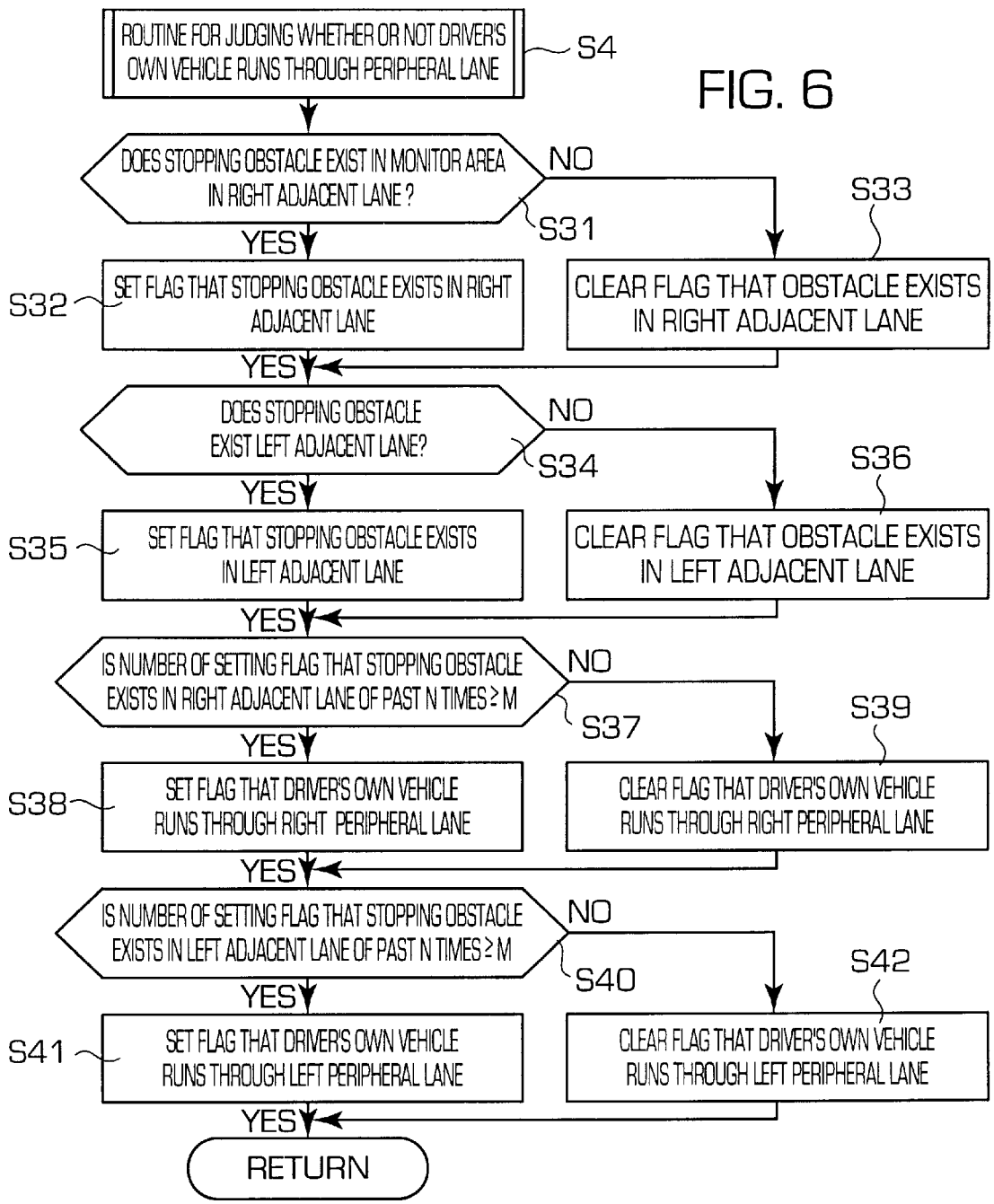
FIG. 6 is a flow chart illustrating a routine for judging whether or not a driver's own vehicle runs through peripheral lanes by the alarm device for vehicle according to Embodiment 1 of the present invention.

FIG. 6 is a flow chart illustrating a routine for judging whether or not the own vehicle runs through the peripheral lanes in the alarm device for vehicle according to Embodiment 1.

Figure 7:
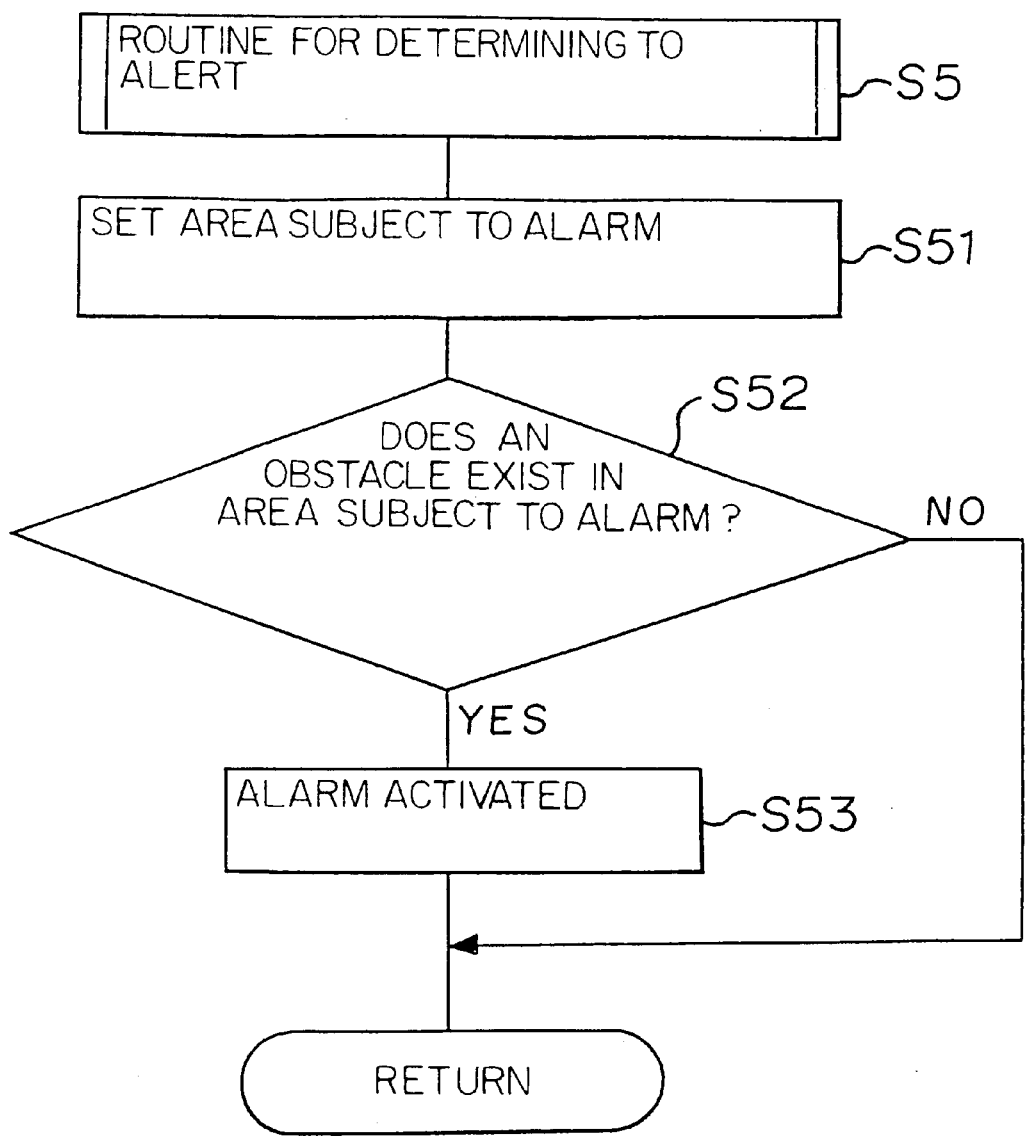
FIG. 7 is a flow chart illustrating a routine for determining the alarm by the alarm device for vehicle according to Embodiment 1 of the present invention.

FIG. 7 is a flow chart illustrating a routine for determining alarm in the alarm device for vehicle according to Embodiment 1.

Figure 8:
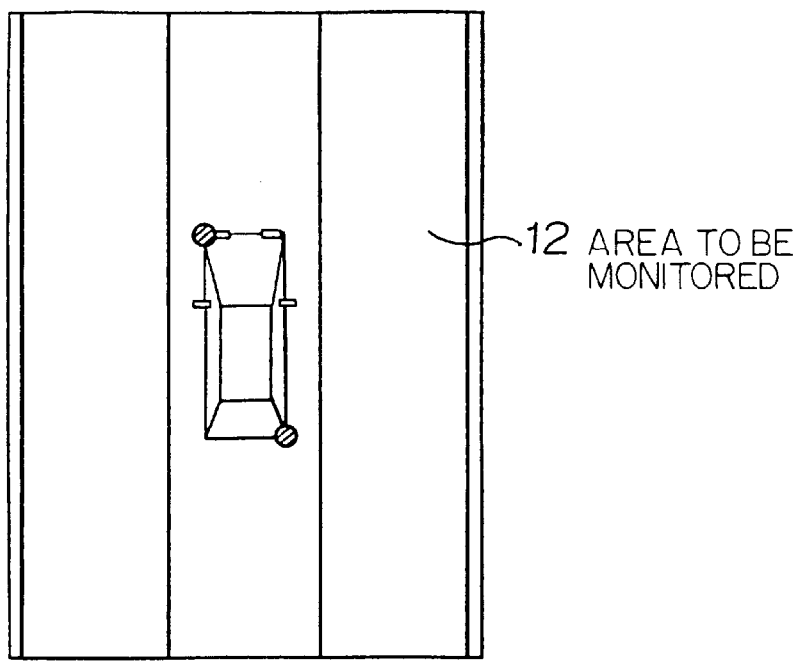
FIG. 8 illustrates an area to be monitored by the alarm device for vehicle according to Embodiment 1 of the present invention.

FIG. 8 illustrates an area subjected to monitoring 12 which is monitored by the alarm device for vehicle according to Embodiment 1.

Figure 9:
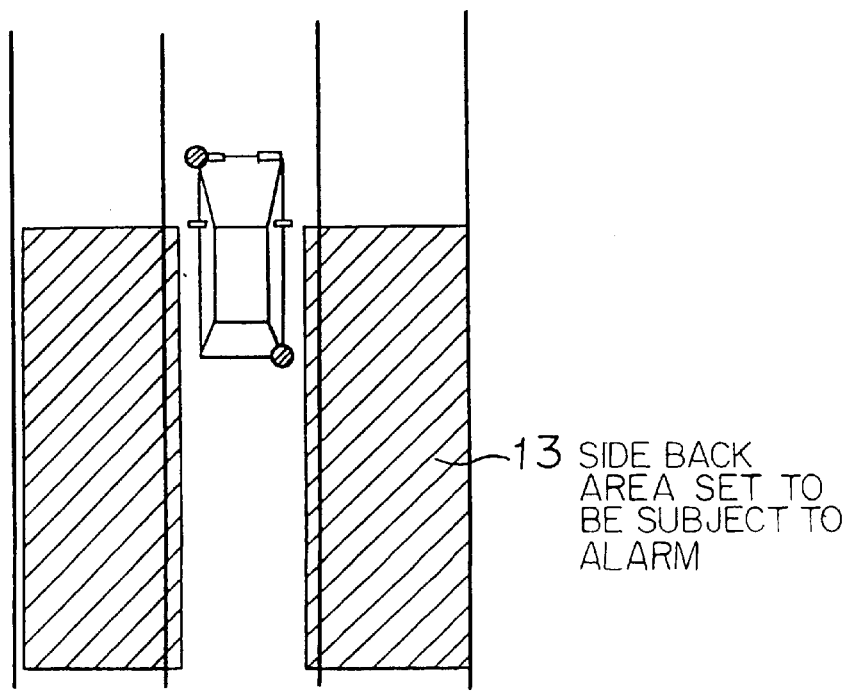
FIG. 9 illustrates an area subjected to alarm in the alarm device for vehicle in Case 1 according to Embodiment 1 of the present invention.

FIG. 9 illustrates an area subjected to the alarm 13 in the alarm device for vehicle in Case 1 of the Embodiment 1.

Figure 10:
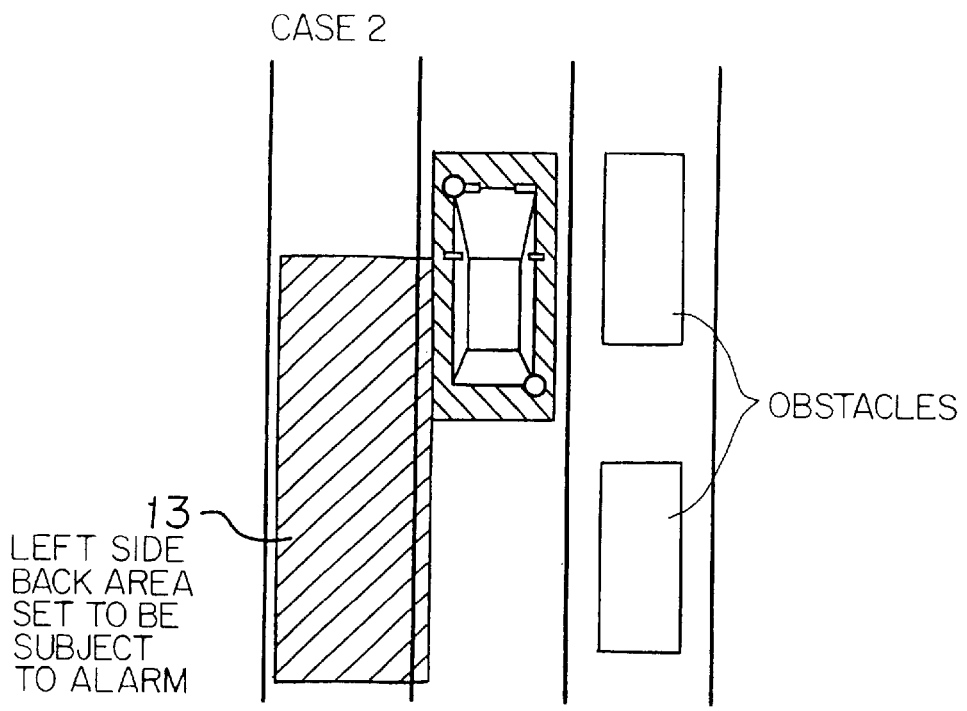
FIG. 10 illustrates an area subjected to alarm in the alarm device for vehicle in Case 2 according to Embodiment 1 of the present invention.

FIG. 10 illustrates an area subjected to the alarm 13 in the alarm device for vehicle in Case 2 of the Embodiment 1.

Figure 11:
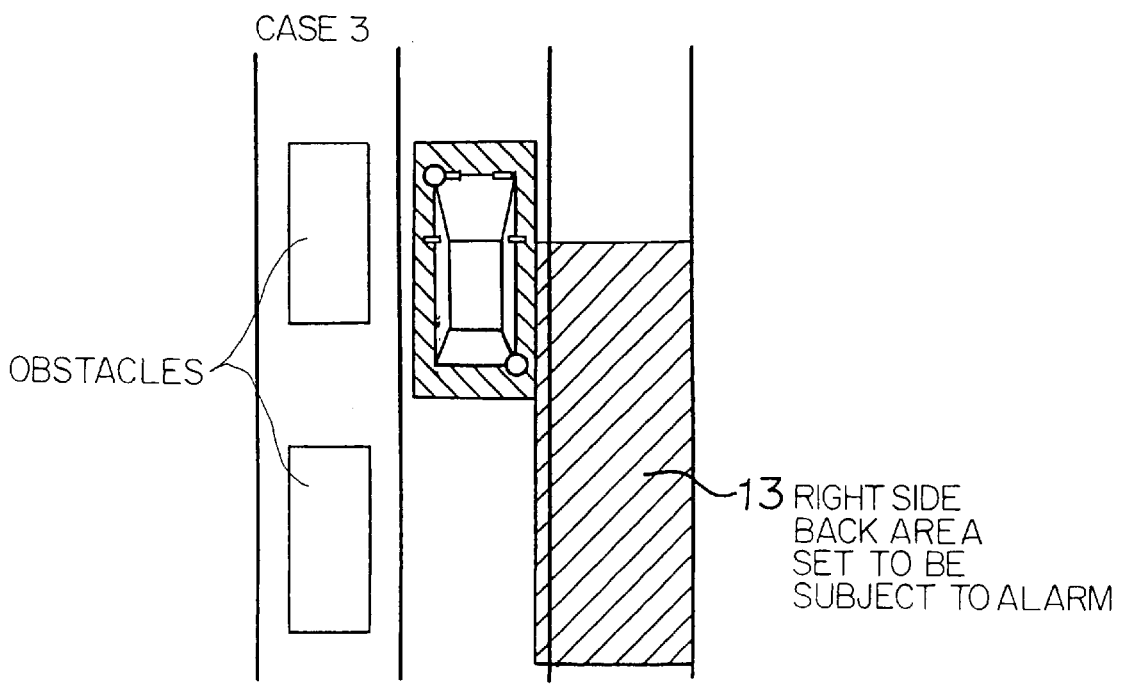
FIG. 11 illustrates an area subjected to alarm in the alarm device for vehicle in Case 3 according to Embodiment 1 of the present invention.

FIG. 11 illustrates an area subjected to the alarm 13 in the alarm device for vehicle in Case 3 of the Embodiment 1.

Figure 12:
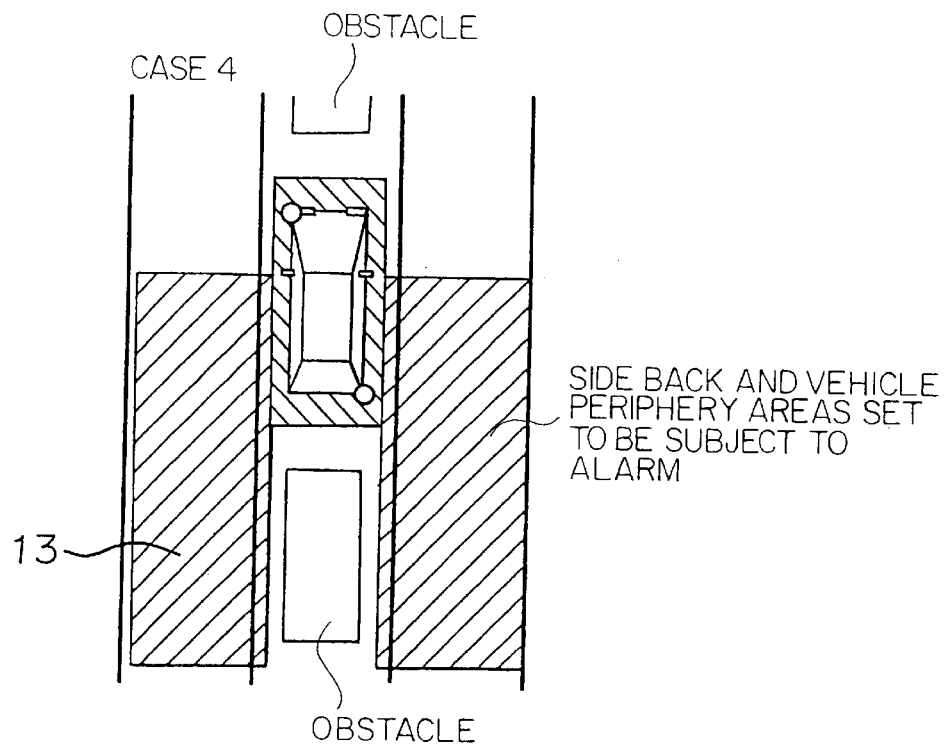
FIG. 12 illustrates an area subjected to alarm in the alarm device for vehicle in Case 4 according to Embodiment 1 of the present invention.

FIG. 12 illustrates an area subjected to the alarm 13 in the alarm device for vehicle in Case 4 of the Embodiment 1.

Figure 13:
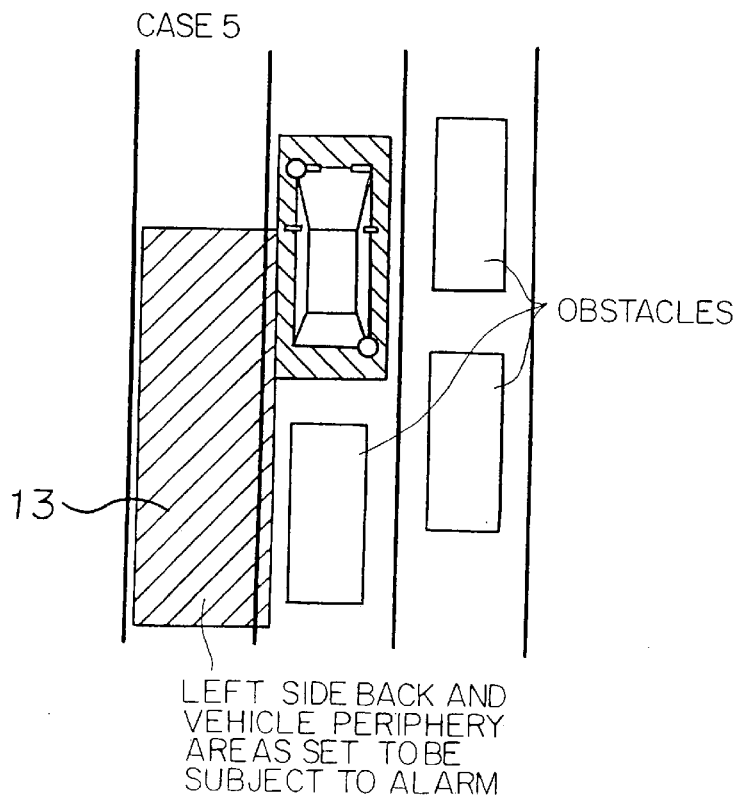
FIG. 13 illustrates an area subjected to alarm in the alarm device for vehicle in Case 5 according to Embodiment 1 of the present invention.

FIG. 13 illustrates an area subjected to the alarm 13 in the alarm device for vehicle in Case 5 of the Embodiment 1.

Figure 14:
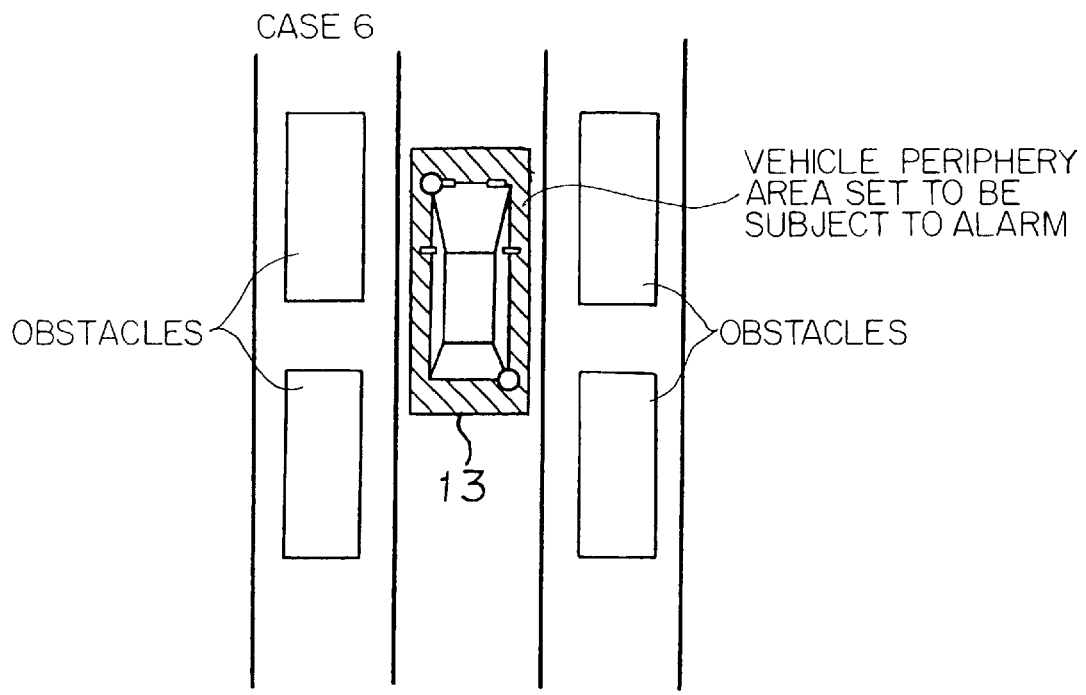
FIG. 14 illustrates an area subjected to alarm in the alarm device for vehicle in Case 6 according to Embodiment 1 of the present invention.

FIG. 14 illustrates an area subjected to the alarm 13 in the alarm device for vehicle in Case 6 of the Embodiment 1.

Figure 15:
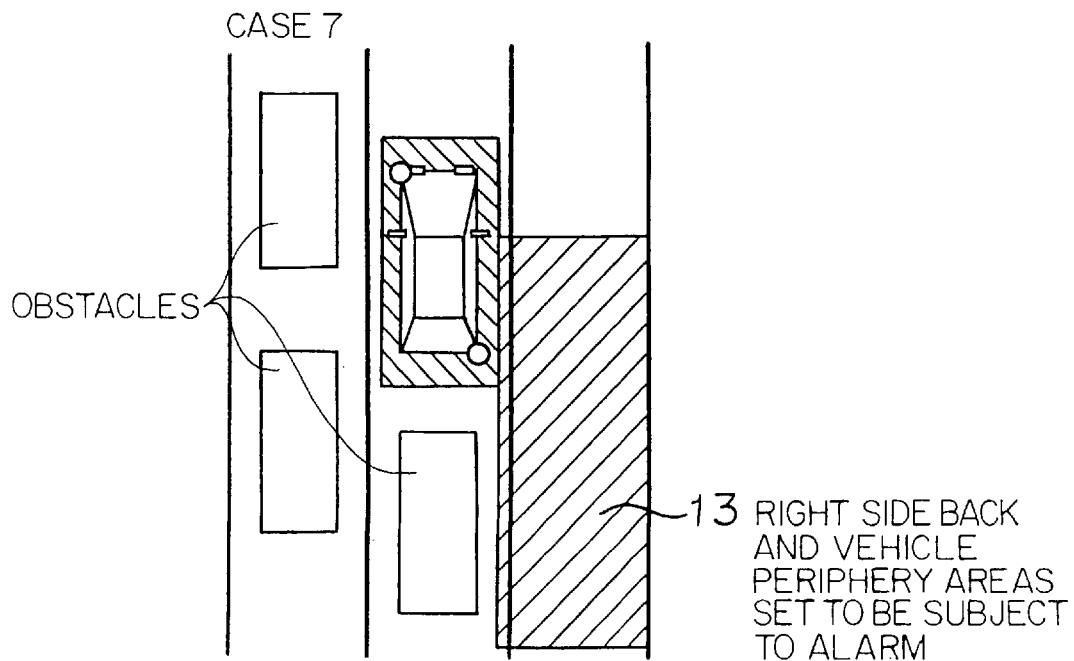
FIG. 15 illustrates an area subjected to alarm in the alarm device for vehicle in Case 7 according to Embodiment 1 of the present invention.

FIG. 15 illustrates an area subjected to the alarm 13 in the alarm device for vehicle in Case 7 of the Embodiment 1.

Figure 16:
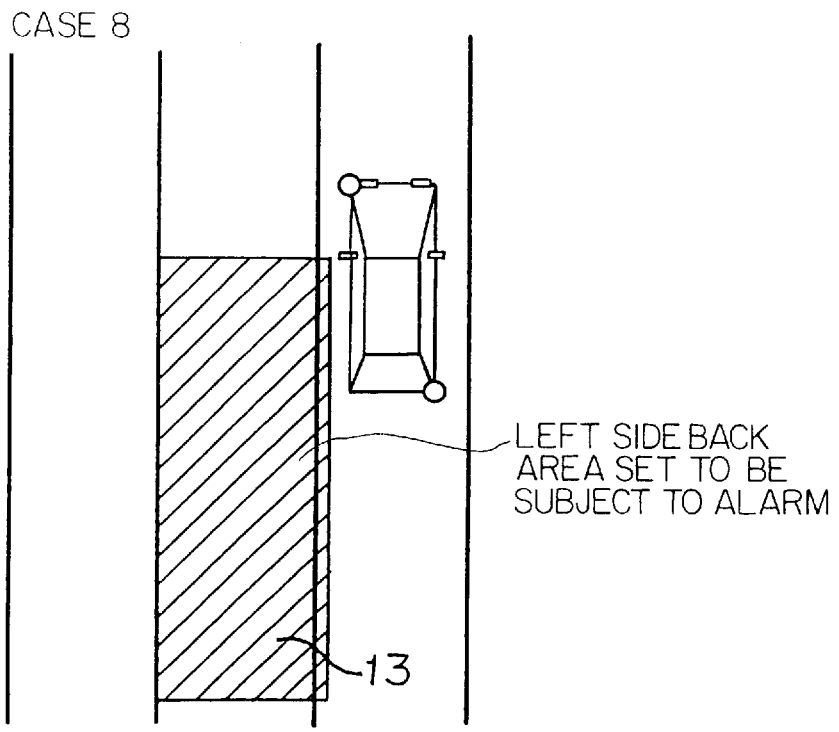
FIG. 16 illustrates an area subjected to alarm in the alarm device for vehicle in Case 8 according to Embodiment 1 of the present invention.

FIG. 16 illustrates an area subjected to the alarm 13 in the alarm device for vehicle in Case 8 of the Embodiment 1.

Figure 17:
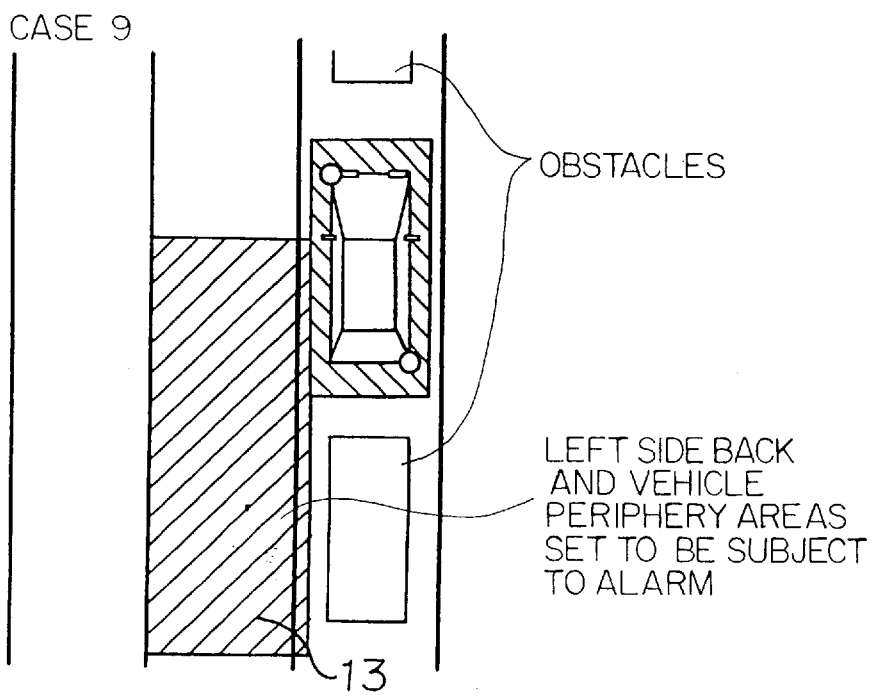
FIG. 17 illustrates an area subjected to alarm in the alarm device for vehicle in Case 9 according to Embodiment 1 of the present invention.

FIG. 17 illustrates an area subjected to the alarm 13 in the alarm device for vehicle in Case 9 of the Embodiment 1.

Figure 18:
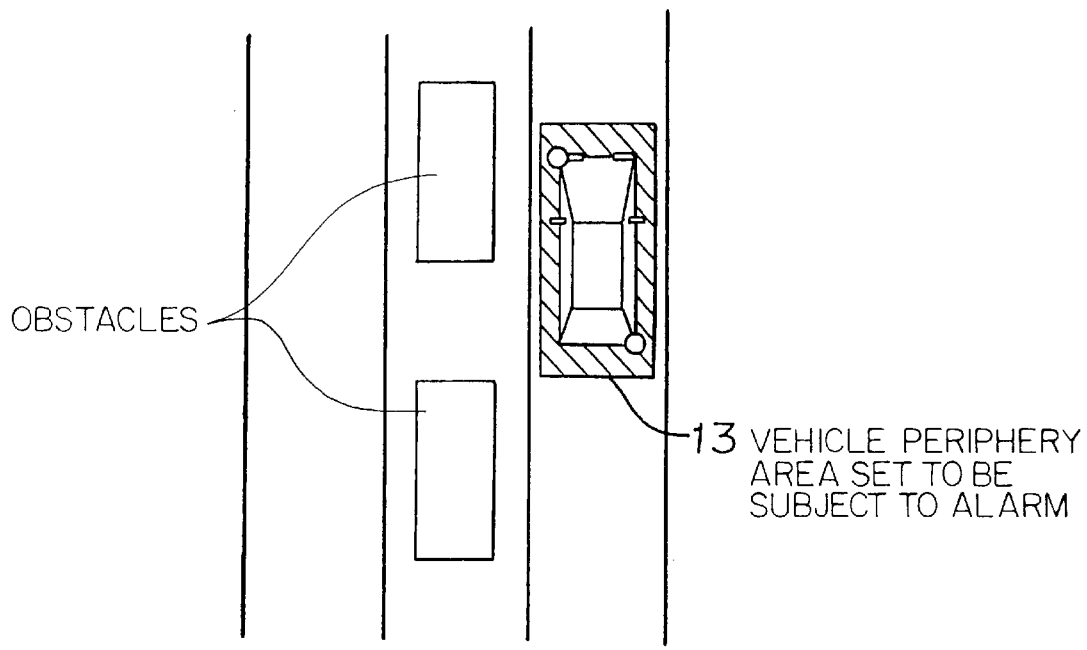
FIG. 18 illustrates an area subjected to alarm in the alarm device for vehicle in Case 10 according to Embodiment 1 of the present invention.

FIG. 18 illustrates an area subjected to the alarm 13 in the alarm device for vehicle in Case 10 of the Embodiment 1.

Figure 19:
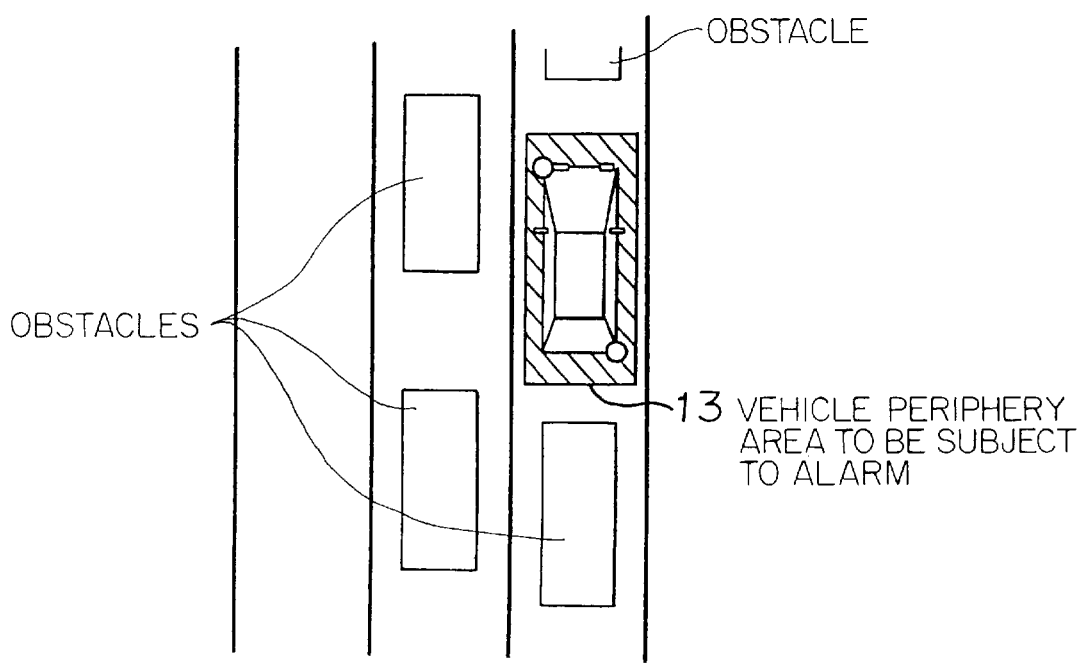
FIG. 19 illustrates an area subjected to alarm in the alarm device for vehicle in Case 11 according to Embodiment 1 of the present invention.
Figure 20:
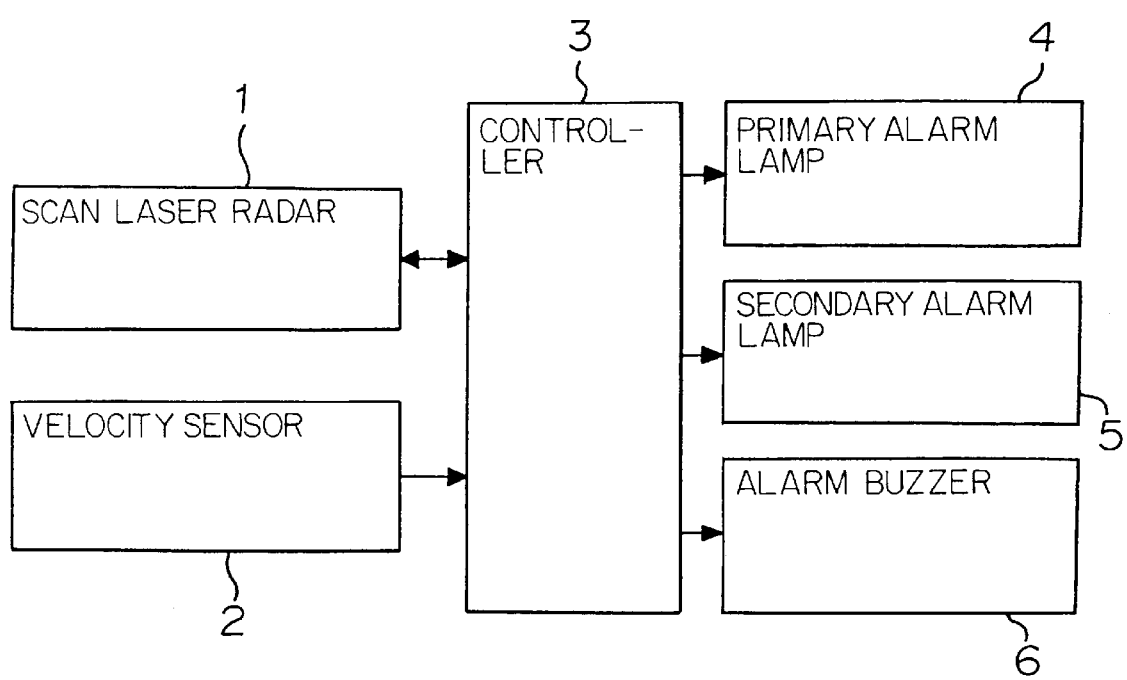
FIG. 20 schematically illustrates a structure of a conventional alarm device for vehicle operable at a time of changing lanes.
Figure 21:
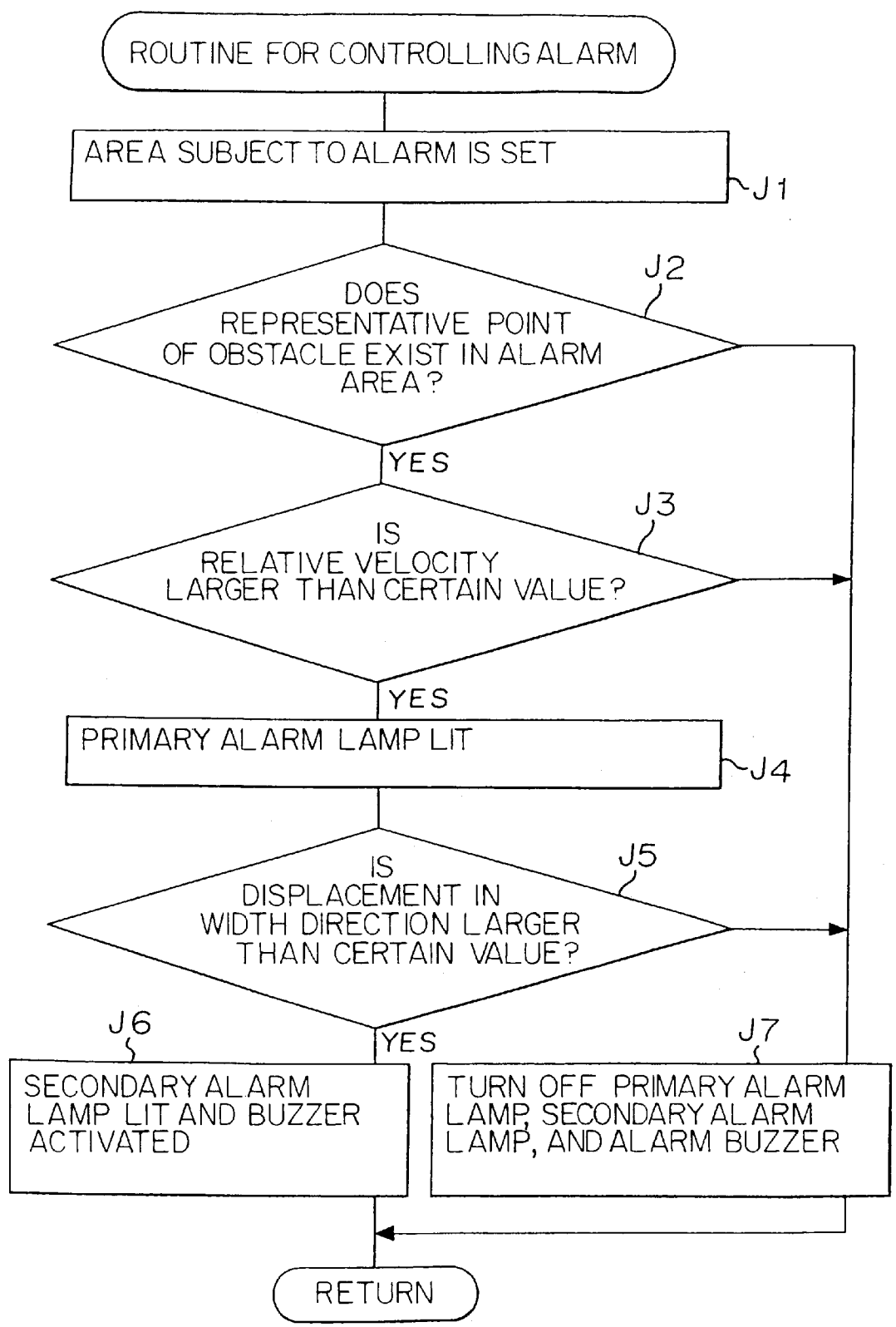
FIG. 21 is a flow chart of processes in the conventional alarm device for vehicle.

FIG. 19 illustrates an area subjected to the alarm 13 in the alarm device for vehicle in Case 11 of the Embodiment 1.

In FIGS. 9 through 19, numerical reference 13 designates the area subjected to the alarm set by the routine for determining the alarm.

In the next, an operation will be described.

The two scan laser radars 1 are attached to the vehicle in diagonal directions of the vehicle as illustrated in FIG. 2, wherein because the scan laser radars 1a, 1b respectively have a detecting area 8 of 270° C. to enable to detect the entire circumference of the vehicle. Into the controller 3, outputs from the scan laser radars 1 and the velocity sensor 2 are inputted.

In the controller 3, information of ranges and directions from the scan laser radars 1 is inputted in the obstacle recognizing means 9 to thereby detect shapes and positions of obstacles and simultaneously recognize types of the obstacles by comparing the detected shapes with predetermined shapes. Outputs from the obstacle recognizing means 9 are inputted in the lane state recognizing means 10. In the lane state recognizing means 10, it is judged whether or not a lane where a driver's own vehicle runs and lanes adjacent thereto are congested and whether or not the own vehicle runs through the peripheral lanes, and the judgement is inputted into the alarm determining means 11. In the alarm determining means 11, it is judged whether or not the alarm is conducted based on the information from the obstacle recognizing means 9 and the lane state recognizing means 10, wherein when it is judged that there is a danger, the alarm means 7 alerts.

In the next, a detailed operation of the alarm device for vehicle operable at a time of changing lanes according to Embodiment 1 will be described in reference of the flow chart of the routine for controlling alarm illustrated in FIG. 4.

In Step S1, a shape and a position of an obstacle is detected from an output from the scan laser radars 1. In Step S2, the obstacle is recognized by comparing the detected shape with a predetermined shape by the obstacle recognizing means 9 based on the information. In Step S3, the routine for judging congestion of lane is processed after recognizing the obstacle.

In the next, an operation of the routine for judging congestion of lane in Step S3 will be described in reference of the flow chart illustrated in FIG. 5.

It is judged that an adjacent lane is congested when the number of vehicles existing in the adjacent lane within a predetermined time period is larger than a predetermined value. Further, it is judged that the lane where the own vehicle runs is congested when the number of vehicles existing in the lane where the own vehicle runs is larger than a predetermined value or the velocity of the own vehicle is smaller than a predetermined value within a predetermined time period.

According to this routine for judging congestion of lane S3, in Step S11, it is judged whether or not a vehicle recognized by the step of recognizing obstacle S2 exists within an area subjected to monitoring 12 in a lane right adjacent thereto. In Step S12, a flag indicating that a vehicle exists in the lane right adjacent thereto is set when the recognized vehicle exists. In Step S13, the flag is cleared when the recognized vehicle does not exists. Similarly, it is judged whether or not the recognized vehicle exists with respect to a lane left adjacent thereto in Step S14 and the lane where the own vehicle runs in Step S17, and a flag indicating that a vehicle exists in the lane left adjacent thereto is set in Step S15 or cleared in Step S16, and a flag indicating that a vehicle exists in the lane where the own vehicle runs is set in Step S18 or cleared in Step S19.

In the next, when the number of setting the flag concerning the lane right adjacent is M or more in Step S20, the lane right adjacent is considered to be in congestion and a flag indicating congestion of the lane right adjacent is set to Step S21. When the number is less than M, the flag indicating congestion of the lane right adjacent is cleared in Step S22. Similarly, as for the lane right adjacent, it is judged whether or not there is congestion in Step S23 and a flag indicating congestion of the lane left adjacent is set to Step S24 or cleared in Step S25. As for the lane where the own vehicle runs, when the flag indicating that a vehicle exists in the lane where the own vehicle runs of as much as past N times is M or more or the velocity of the own vehicle is smaller than a predetermined value within a predetermined time period in Step S26, a flag indicating congestion of the lane where the own vehicle runs is set to Step S27, if not, the flag indicating congestion of the lane where the own vehicle runs is cleared in Step S28. After finishing the routine for judging congestion of lane S3, a routine for judging whether or not the own vehicle runs through the peripheral lanes is processed.

In the next, an operation of a routine for judging whether or not the own vehicle runs through the peripheral lanes is described in reference of a flow chart illustrated in FIG. 6.

It is judged by calculating the number of detected stopping obstacles in lanes adjacent to the lane where the own vehicle runs within a predetermined time period and comparing the number with a predetermined value. In the routine for judging whether or not the own vehicle runs through the peripheral lanes S4, it is judged whether or not the stopping obstacles recognized in Step S2 for recognizing the obstacles exist in the area subjected to monitoring 12 in the lane right adjacent to the lane where the own vehicle runs in Step S31. When a stopping obstacle exists, a flag indicating whether or not the stopping obstacle exists in the lane right adjacent is set to Step S32, and if not, the flag is cleared in Step S33. Similarly, it is judged whether or not a stopping obstacle exists in the lane left adjacent in Step S34, and a flag indicating whether or not a stopping obstacle exists in the lane left adjacent is set to Step S35 or cleared in Step S36. In the next, when the number of setting the flag concerning the lane right adjacent of as much as past N times is M or more in Step S37, a flag that the own vehicle runs through the right peripheral lane is set by considering the own vehicle runs through the right peripheral lane in Step S38, and if the number is less than M, the flag indicating that the own vehicle runs through the right peripheral lane is cleared in Step S39. Similarly, it is judged whether or not the own vehicle runs through the left peripheral lane in Step S40, and a flag indicating that the own vehicle runs through the left peripheral lane is set to Step S41 or cleared in Step S42. After finishing the routine for judging whether or not the own vehicle runs through the peripheral lanes S4, a routine for determining alarm S5 is processed.

An operation of the routine for determining alarm S5 will be described in reference of a flow chart illustrated in FIG. 7.

In the routine for determining alarm S5, an area subjected to alarm 13 is set to Step S51. The area subjected to alarm is variable depending on situations of the lane where the own vehicle runs and lanes adjacent thereto. Further, in Step S52, it is judged whether or not obstacles exist in the area subjected to alarm, and if an obstacle exists, it is considered to be dangerous and an alarm is conducted for a driver in Step S53.

Hereinbelow, the area subjected to alarm 13 under various situations is described.

(Case 1) Lane where own vehicle runs and lanes adjacent thereto are not congested.

The area subjected to alarm 13 is set to a side back of the own vehicle in the adjacent lanes as illustrated in FIG. 9.

(Case 2) Lane where own vehicle runs and lane left adjacent thereto are not congested and lane right adjacent thereto is congested.

The area subjected to alarm 13 is set to a side back in the lane left adjacent and a periphery of the own vehicle as illustrated in FIG. 10. Because the lane right adjacent is congested, the area subjected to alarm is not set to a back side in the lane right adjacent. However, because contacts with vehicles in the lane right adjacent are anticipated when the own vehicle changes lane to the right, a predetermined range around the periphery of the own vehicle is set to be the area subjected to alarm.

(Case 3) Lane where own vehicle runs and lane right adjacent thereto are not congested and lane left adjacent thereto is congested.

The area subjected to alarm 13 is set to a side back in the lane right adjacent and a periphery of the own vehicle as illustrated in FIG. 11. The same reason in Case 2 is applicable thereto.

(Case 4) Lane where own vehicle runs is congested and lanes left and right adjacent thereto are not congested.

The area subjected to alarm 13 is set to a side back in the lanes left and right adjacent thereto and a periphery of the own vehicle as illustrated in FIG. 12. Because contacts with vehicles in the lane where the own vehicle runs is anticipated at a time of changing lanes because of the congestion of the lane where the own vehicle runs, a predetermined range from the periphery of the own vehicle is set to be the area subjected to alarm.

(Case 5) Lane where own vehicle runs and lane right adjacent thereto are congested and lane left adjacent thereto is not congested.

The area subjected to alarm 13 is set to a side back in the lane left adjacent and a periphery of the own vehicle as illustrated in FIG. 13. Because the lane right adjacent is congested, the area subjected to alarm in a side back in the lane right adjacent is not set. However, because contacts with vehicles in the lane right adjacent or the Lane where the own vehicle runs are anticipated at a time of changing lanes, the area subjected to alarm is set to a predetermined range around the periphery of the own vehicle.

(Case 6) Lane where own vehicle runs is not congested and lanes left and right adjacent thereto are congested.

The area subjected to alarm 13 is set to a periphery of the own vehicle as illustrated in FIG. 14. Because the lanes left and right adjacent thereto are congested, the area subjected to alarm in a side back in the lanes left and right adjacent are not set. However, because contacts with vehicles in the lane right adjacent or the lane left adjacent are anticipated at a time of changing lanes, the area subjected to alarm is set to a predetermined range around the own vehicle.

(Case 7) Lane where own vehicle runs and lane left adjacent thereto are congested and lane right adjacent thereto is not congested.

The area subjected to alarm 13 is set to a side back in the lane right adjacent and a periphery of the own vehicle as illustrated in FIG. 15. The same reason as that in Case 5 is applicable.

(Case 8) Own vehicle runs through right peripheral lane, and lane where own vehicle runs and lane left adjacent thereto are not congested.

The area subjected to alarm 13 is set to a back side in the lane left adjacent as illustrated in FIG. 16. Because the own vehicle runs through the right peripheral lane, the area subjected to alarm in a side back in the lane right adjacent is not set.

(Case 9) Own vehicle runs through right peripheral lane, and lane where own vehicle runs is congested and lane left adjacent thereto is not congested.

The area subjected to alarm 13 is set to a side back in the lane left adjacent and a periphery of the own vehicle as illustrated in FIG. 17.

Because contacts with vehicles in the lane where the own vehicle runs are anticipated at a time of changing lanes because of the congestion of the lane where the own vehicle runs, the area subjected to alarm is set to a predetermined range around the periphery of the own vehicle.

(Case 10) Own vehicle runs through right peripheral lane, and lane where own vehicle runs is not congested and lane left adjacent thereto is congested.

The area subjected to alarm 13 is set to a periphery of the own vehicle as illustrated in FIG. 18. The area subjected to alarm is not set to a side back in the lanes left and right adjacent. However, because contacts with vehicles in the lane left adjacent are anticipated at a time of changing lanes to the left, the area subjected to alarm is set to a predetermined range around the periphery of the own vehicle.

(Case 11) Own vehicle runs through right peripheral lane, and lane where own vehicle runs and lane left adjacent thereto are congested.

The area subjected to alarm 13 is set to a periphery of the own vehicle as illustrate in FIG. 19. The area subjected to alarm is not set to the lanes left and right adjacent. Because contacts with vehicles in the lane where the own vehicle runs and the lane left adjacent thereto are anticipated at a time of changing lane to the left, the area subjected to alarm is set to a predetermined range around the periphery of the own vehicle.

In case that the own vehicle runs through the left peripheral lane, the area subjected to alarm 13 is set to under an idea similar to these in Cases 8, 9, 10, and 11.

By setting the area subjected to alarm as described, it is possible to cease alarms in case of congestion and in case that the own vehicle runs through the peripheral lanes.

The first advantage of the alarm device for vehicle according to the present invention is that a state of lanes are recognized without manipulating a turn signal indicator switch, whereby an effective alarm can be conducted.

The second advantage of the alarm device for vehicle according to the present invention is that an alarm is not conducted in case of congestion and the congestion is certainly recognized based on the number of the obstacles to be recognized within a predetermined time period for each lane.

The third advantage of the alarm device for vehicle according to the present invention is that congestion is certainly recognized based on a velocity of an own vehicle being a predetermined value or less for a predetermined time period, and an alarm is not conducted based on a stopping obstacle existing out of a lane where a driver's own vehicle runs when this lane is one of the peripheral lanes.

The fourth advantage of the alarm device for vehicle according to the present invention is that it is possible to certainly recognize that a lane where a driver's own vehicle runs is one of the peripheral lanes based on the number of stopping obstacles therein, and unnecessary alarms are not conducted by setting an optimum area for alerting.

The fifth advantage of the alarm device for vehicle according to the present invention is that an alarm based on adjacent lanes being in congestion is not conducted, and an alarm based on a stopping obstacle existing out of a lane where a driver's own vehicle runs is not conducted in case that this lane is one of the peripheral lanes.

Obviously, numerous modifications and variations of the present invention are possible in light of the above teachings. It is therefore to be understood that within the scope of the appended claims, the invention may be practiced otherwise than as specifically described herein.

What is claimed is:

1. An vehicle alarm device operable at a time of changing lanes comprising:

an obstacle detecting means for detecting obstacles in a lane where a driver's own vehicle runs and lanes adjacent thereto, an obstacle recognizing means for recognizing the obstacles detected by said obstacle detecting means, a lane state recognizing means for recognizing a state of lanes based on the obstacles recognized by said obstacle recognizing means, an alarm determining means for determining whether or not an alarm is necessary using the obstacles recognized by said obstacle recognizing means and the state of lanes recognized by said lane state recognizing means, and an alarm means for alerting said driver based on determination by said alarm determining means.

2. The vehicle alarm device according to claim 1, wherein the state of lanes recognized by said lane state recognizing means is congestion of the lane where the driver's own vehicle runs and the lanes adjacent thereto.

3. The vehicle alarm device according to claim 2, wherein the congestion of the lane where the driver's own vehicle runs and the lanes adjacent thereto is recognized based on the number of the obstacles recognized by said obstacle recognizing means for each lane within a predetermined time period by said lane state recognizing means.

4. The vehicle alarm device according to claim 3, wherein the state of lanes is recognized by said lane state recognizing means when the lane where the driver's own vehicle runs is one of the peripheral lanes to the road where the driver's own vehicle runs.

5. The vehicle alarm device according to claim 4, wherein the state of lanes recognized by said lane state recognizing means, when the lane where the driver's own vehicle runs is one of the peripheral lanes, is obtained based on the number of stopping obstacles in a lane adjacent to the lane where the driver's own vehicle runs recognized by said obstacle recognizing means within a predetermined period.

6. The vehicle alarm device according to claim 2, wherein the congestion of the lane where the driver's own vehicle runs is recognized by said lane state recognizing means based on a velocity of the driver's own vehicle being equal to or less than a predetermined value for a predetermined time period.

7. The vehicle alarm device according to claim 6, wherein the state of lanes is recognized by said lane state recognizing means when the lane where the driver's own vehicle runs is one of the peripheral lanes to the road where the driver's own vehicle runs.

8. The vehicle alarm device according to claim 7, wherein the state of lanes recognized by said lane state recognizing means, when the lane where the driver's own vehicle runs is one of the peripheral lanes, is obtained based on the number of stopping obstacles in a lane adjacent to the lane where the driver's own vehicle runs recognized by said obstacle recognizing means within a predetermined period.

9. The vehicle alarm device according to claim 2, wherein the state of lanes is recognized by said lane state recognizing means when the lane where the driver's own vehicle runs is one of the peripheral lanes to the road where the driver's own vehicle runs.

10. The vehicle alarm device according to claim 9, wherein the state of lanes recognized by said lane state recognizing means, when the lane where the driver's own vehicle runs is one of the peripheral lanes, is obtained based on the number of stopping obstacles in a lane adjacent to the lane where the driver's own vehicle runs recognized by said obstacle recognizing means within a predetermined period.

11. The vehicle alarm device according to claim 2, wherein said alarm determining means sets an area subjected to the alarm based on the state of lanes recognized by said lane state recognizing means and determines whether or not the alarm is necessary based on the obstacles recognized by said obstacle recognizing means within the set area subjected to the alarm.

12. The vehicle alarm device according to claim 11, wherein the area subjected to the alarm set by said alarm determining means excludes a lane adjacent on the left of the lane of the driver's own vehicle when the lane of the driver's own vehicle is a left peripheral lane of a road of the driver's own vehicle or a lane adjacent on the right of the lane of the driver's own vehicle when the lane of the driver's own vehicle is the right peripheral lane of the road.

13. The vehicle alarm device according to claim 11, wherein the area subjected to the alarm set by said alarm determining means excludes a lane adjacent to the lane where the driver's own vehicle runs when said adjacent lane is congested.

14. The vehicle alarm device according to claim 13, wherein the area subjected to the alarm set by said alarm determining means excludes a lane adjacent on the left of the lane of the driver's own vehicle when the lane of the driver's own vehicle is the left peripheral lane of a road of the driver's own vehicle or a lane adjacent on the right of the lane of the driver's own vehicle when the lane of the driver's own vehicle is a right peripheral lane of the road.

15. The vehicle alarm device according to claim 1, wherein the state of lanes is recognized by said lane state recognizing means when the lane where the driver's own vehicle runs is one of the peripheral lanes to the road where the driver's own vehicle runs.

16. The vehicle alarm device according to claim 15, wherein the state of lanes recognized by said lane state recognizing means, when the lane where the driver's own vehicle runs is one of the peripheral lanes, is obtained based on the number of stopping obstacles in a lane adjacent to the lane where the driver's own vehicle runs recognized by said obstacle recognizing means within a predetermined period.

17. The vehicle alarm device according to claim 1, wherein said alarm determining means sets an area subjected to the alarm based on the state of lanes recognized by said lane state recognizing means and determines whether or not the alarm is necessary based on the obstacles recognized by said obstacle recognizing means within the set area subjected to the alarm.

18. The vehicle alarm device according to claim 17, wherein the area subjected to the alarm set by said alarm determining means excludes a lane adjacent to the lane where the driver's own vehicle runs when said adjacent lane is congested.

19. The vehicle alarm device according to claim 18, wherein the area subjected to the alarm set by said alarm determining means excludes a lane adjacent on the left of the lane of the driver's own vehicle when the lane of the driver's own vehicle is the left peripheral lane of a road of the driver's own vehicle or a lane adjacent on the right of the lane of the driver's own vehicle when the lane of the driver's own vehicle is the right peripheral lane of the road.

20. The vehicle alarm device according to claim 17, wherein the area subjected to the alarm set by said alarm determining means excludes a lane adjacent on the left of the lane of the driver's own vehicle when the lane of the driver's own vehicle is a left peripheral lane of a road of the driver's own vehicle or a lane adjacent on the right of the lane of the driver's own vehicle when the lane of the driver's own vehicle is a right peripheral lane of the road.

21. A vehicle alarm device usable to alert a driver of a vehicle of obstacles in close proximity to the driver's vehicle, said vehicle alarm device comprising:

an obstacle detector operable to detect obstacles in a lane wherein said driver's vehicle is travelling and areas adjacent thereto;

an obstacle recognizer operable to determine a type of obstacle for said obstacles detected by said obstacle detector;

a lane state recognizer operable to determine a state of the lane wherein said driver's vehicle is travelling and lanes adjacent thereto wherein said lane state recognizer uses information provided by said obstacle detector;

an alarm determiner operable to determine whether or not an alarm is necessary using information provided by said obstacle recognizer and said lane state recognizer, and an alarm operable to alert said driver of an obstacle when said alarm determiner determines said alarm is necessary.

22. A vehicle alarm device in accordance with claim 21 wherein said obstacle recognizer determines said type of obstacle by comparing detected shapes of the detected obstacles to predetermined shapes.

23. A vehicle alarm device in accordance with claim 21 wherein said lane state recognizer determines said state of the lanes is congested when a number of obstacles detected in said lanes exceeds a predetermined number during a predetermined amount of time.

* * * * *